United States Patent [19]

Tanino

[11] Patent Number: 4,639,912

[45] Date of Patent: Jan. 27, 1987

[54] SIGNAL TRANSMISSION APPARATUS

[75] Inventor: Junichi Tanino, Ichinomiya, Japan

[73] Assignee: Mitsubishi Denki Kabushiki Kaisha, Tokyo, Japan

[21] Appl. No.: 652,626

[22] Filed: Sep. 20, 1984

[30] Foreign Application Priority Data

Sep. 30, 1983 [JP] Japan ................................ 58-182203

[51] Int. Cl.[4] ............................ H04J 3/00; H04Q 3/00

[52] U.S. Cl. ........................................ 370/86; 370/16; 340/825.05; 340/825.08

[58] Field of Search ........................ 370/86, 88, 16, 90; 340/825.05, 825.08

[56] References Cited

U.S. PATENT DOCUMENTS 3,601,543 8/1971 Maniere et al. ........................ 370/86

3,824,545 7/1974 Brenner et al. ........................ 370/90

3,986,162 10/1976 Cholez et al. .......................... 370/88

4,386,426 5/1983 Pugh ..................................... 370/90

4,441,302 4/1984 Gabbitas et al. ............... 340/825.05

*Primary Examiner*—Douglas W. Olms
*Assistant Examiner*—Wellington Chin
*Attorney, Agent, or Firm*—Leydig, Voit & Mayer

[57] ABSTRACT

A signal transmission apparatus from a control unit to a plurality of memory units which correspond to signal terminal means and which are connected in series with each other, wherein the memory units at the starting end and at the final end are connected to the control unit to constitute a closed loop, wherein the memory unit at the starting end or the final end receives a gate signal and stores it temporarily to open a gate, and wherein the memory units transfer gate signals to the subsequent stages successively responsive to clock pulses, and having detector means which detects whether the first gate signal has circulated the closed loop constituted by the series connected memory units, and a switch which switches the sending path of the gate signal depending upon the detected result so that the gate signal is sent from the memory unit of either the starting end or the final end.

10 Claims, 6 Drawing Figures

SIGNAL TRANSMISSION APPARATUS

BACKGROUND OF THE INVENTION

1. Field of the Invention

The present invention relates to a signal transmission apparatus for transmitting signals between a control unit and a plurality of signal terminal means.

2. Description of the Prior Art

In an elevator system, a control unit is installed in a machine room, and signals are transmitted between the control unit, platform buttons provided on each of the floors, and cage operation buttons on a board installed in the cage. The machine room is usually located just above the elevator path. The platform buttons and the cage operation board buttons, which are signal terminals, are located more remote from the control unit as the number of the floors increases. To facilitate the connection and reduce the complexity of the wiring between the control unit and the signal terminals, there has been employed an apparatus which transmits signals in series on signal lines instead of transmitting signals in parallel through such lines.

FIGS. 1 and 2 illustrate a conventional signal transmission apparatus employed for an elevator system in which signals are transmitted in series.

In the drawings, reference numeral 1 denotes a control unit which is installed in a machine room of the elevator system, and which generates clock pulse signals and reference signals to register a platform call and a cage call. Reference numeral 3 denotes a signal line for transmitting clock signals *3a* that are generated maintaining a constant period (for example, 500 microseconds), 4 denotes a signal line for transmitting platform call signals 4*a*, 5 denotes a signal line for transmitting platform call registration signals 5*a*, reference numerals 61 to 69 denote platform buttons (up-call buttons and down-call buttons are not specifically shown) of the first to ninth floors, 71 to 79 denote platform call registration lamps that indicate the registration of platform call, 81 to 89 denote memory units consisting of D-type flip-flop circuits which are installed on the first to ninth floors, and to which the signal line 3 is connected through the terminals CL, 91 denotes a signal line which connects the control unit 1 to the memory unit 81, and which transmits a reference signal 91*a* that assumes the high level only for one period (inclusive of a delay of a short period of time) of the clock pulse signal *3a*, 92 to 99 denote signal lines which connect the memory units 81 to 89, and which transmit reference signals 92*a* to 99*a* (signals 95*a* to 99*a* are not diagramed) that assume the high level only for one period (inclusive of a delay of a short period of time) of the clock pulse signal *3a*, successively, being delayed in time, 111 to 119 denote D-type flip-flop circuits (hereinafter referred to as memory units) of which the terminals D are connected to the signal line 5, of which the terminals CL are connected to the terminals Q of the memory units 81 to 89, and of which the terminals Q are connected to the platform call registration lamps 71 to 79, respectively, and reference numerals 121 to 129 denote AND gates of which the input sides are connected to the signal lines 92 to 100 and to the platform buttons 61 to 69, and of which the output sides are connected to the signal line 4.

Reference numeral 101 denotes a signal terminal means consisting of the platform button 61, signal lamp 71, memory 111, and AND gate 121. Similarly, reference numerals 102 to 109 denote signal terminal means of the second to ninth floors.

Next, the operation will be described below.

If a clock pulse signal 3*a* is applied to the signal line 3 and if a reference signal 91*a* is applied to the signal line 91, the output 92*a* at the terminal Q of the memory unit 81 becomes an input 91*a* to the terminal D at the time when the input 3*a* to the terminal CL is rising. Therefore, the output 92*a* assumes the high level for only one period of the clock pulse signal 3*a* when the reference signal 91*a* assumes the low level. Similarly, the reference signals 92*a* to 94*a*, . . . , assume the high level successively being delayed in time as shown in FIG. 2.

Here, if the platform button 62 of the second floor is depressed, output of the AND gate 122 assumes the high level when the reference signal 93*a* assumes the high level, and is transmitted as a platform call signal 4*a* to the control board 1 over the signal line 4.

If the platform button 63 of the third floor is depressed, output of the AND gate 123 assumes the high level when the reference signal 94*a* assumes the high level, and is transmitted as the platform call signal 4*a* over the same signal line 4. Even when the platform button 62 of the second floor and the platform button 63 of the third floor are depressed simultaneously, the platform call signals 4*a* are transmitted in series over the signal line 4, since the clock signals 3*a* have a very small period. This operation is repeated successively to obtain the conditions of the platform buttons 61 to 69.

As a predetermined number of pulses are sent as clock signals 3*a*, the data are all collected. These signals are processed by the control unit 1, and are registered as a platform call.

The thus registered platform call registration signal 5*a* is transmitted through the signal line 5, whereby the input assumes the high level at the terminal D of the memory unit 112. In this case, since the signal 93*a* of the high level is input to the terminal CL of the memory unit 112, the output at the terminal Q assumes the high level, and this level is maintained. Therefore, the platform call registration lamp 72 of the second floor turns on, indicating that the platform call is registered. Similarly, the platform call registration lamp 73 of the third floor also turns on.

The registration lamps 72, 73 can be turned off according to the same procedure as described above, though not described here in detail. That is, if the platform call registration signal 5*a* of the signal line 5 is rendered to assume the low level when the cage of the elevator has arrived at the second floor, the output at the terminal Q of the memory unit 112 assumes the low level when the reference signal 93*a* rises, and the platform call registration lamp 72 of the second floor turns off. The same also holds true for the registration lamp 73 of the third floor.

Namely, only four signal lines 3 to 5, and 91 are required to connect the platforms to the machine room.

However, although the number of signal lines can be reduced, this system is seriously affected in case, for instance, the lines are broken. For example, if the memory unit 82 becomes defective, and the signal 93*a* assumes the low level at all times, the memory units 83 to 89 all assume the low level, and the call is not registered by the platform buttons 62 to 69. Further, if the memory unit 81 becomes defective, the call is not registered by the platform buttons 61, 62, . . . , and the elevator is placed out of service.

SUMMARY OF THE INVENTION

The present invention is aimed to overcome the above-mentioned inconveniences, and its object is to provide a signal transmission apparatus in which in case of a fault in one of the series connected memory units or lines connecting the memory units, the signals are transmitted to the end memory unit instead of the starting memory unit and in the opposite direction between the memory units of the series in order to minimize the effect of the fault.

In order to achieve the above object, the present invention deals with a signal transmission apparatus which comprises:

a plurality of signal terminal means which are connected in parallel with signal lines running from a control unit, and which transmit signals to the signal lines via gates;

pulse generator means which is provided in said control unit and which generates clock pulses;

a counter which counts said clock pulses, and which generates a gate signal every after the clock pulses are produced in a predetermined number which is greater than the number of said signal terminal means;

a plurality of memory means which are corresponded to said signal terminal means, and which are connected in series with each other, wherein the memory means at the starting end and at the final end are connected to said control unit to constitute a closed loop, wherein the memory means at the starting end or the final end receives said gate signal and stores it temporarily to open the gate of the corresponding signal terminal means, and wherein said memory means transfers said gate signals to the subsequent stage successively responsive to said clock pulses;

detector means which detects whether said first gate signal has circulated the closed loop constituted by said memory means from the moment when said counter has generated the first gate signal to the moment when the next gate signal is generated; and switching means which switches the sending path of said gate signal so that the gate signal is sent from the memory means of either the starting end or the final end, depending upon the detected result of said detector means.

BRIEF DESCRIPTION OF THE DRAWINGS

FIGS. 1 and 2 illustrate a conventional signal transmission apparatus, wherein;

FIG. 1 is a block diagram showing the whole signal transmission apparatus;

FIG. 2 is a diagram for illustrating the operation;

FIGS. 3 to 6 illustrate an embodiment of the present invention, wherein;

FIG. 3 is a diagram which corresponds to FIG. 1;

FIG. 4 is a diagram of electric circuit connection which shows, in detail, a portion of the control unit 1;

FIG. 5 is a diagram of electric circuit connection which shows, in detail, a portion of FIG. 3; and FIG. 6 is a diagram for illustrating the operation.

DESCRIPTION OF THE PREFERRED EMBODIMENT

Figure 1:
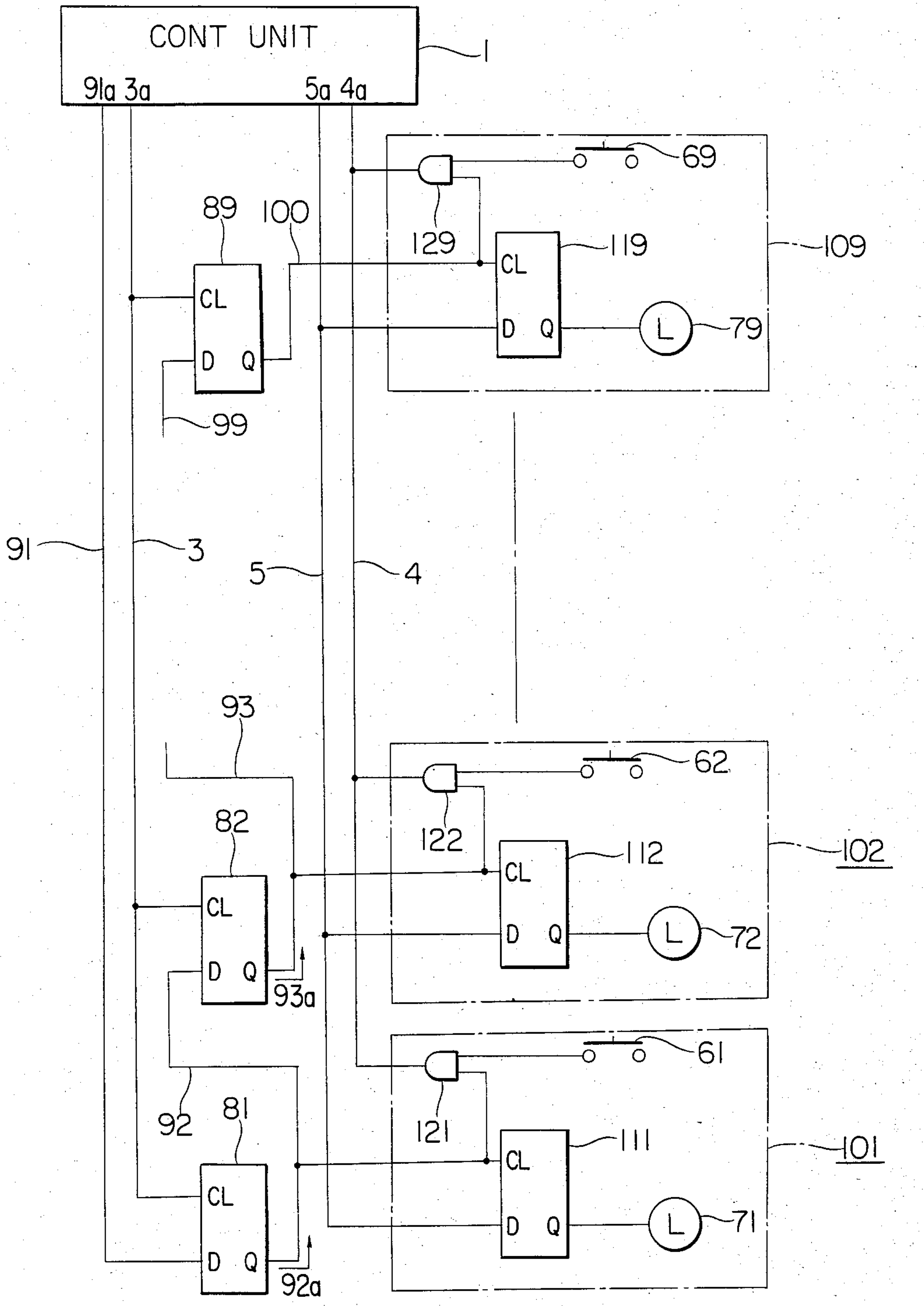
FIG. 1 PRIOR ART
Figure 2:
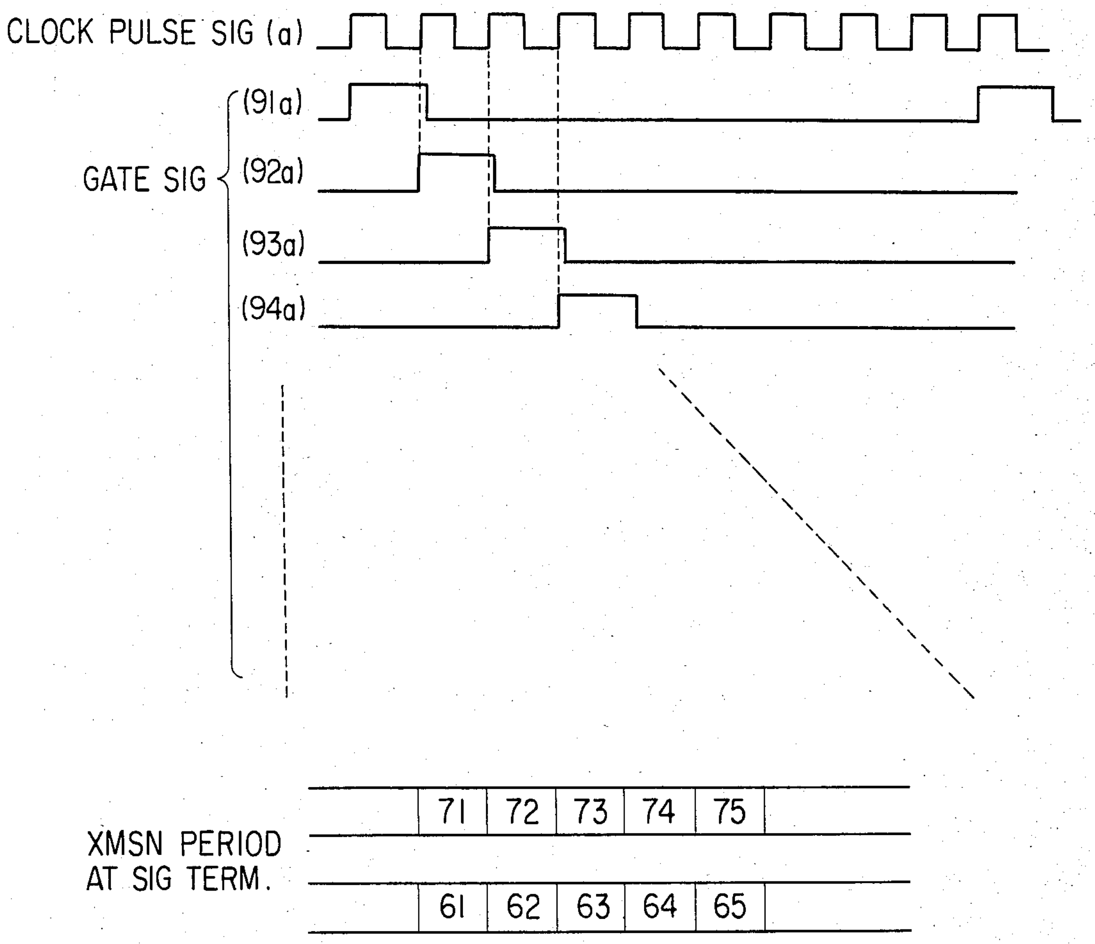
FIG. 2 PRIOR ART

An embodiment of the invention will be described below in conjunction with FIGS. 3 to 6. In the drawings, the same reference numerals as those of FIGS. 1 and 2 denote the same or corresponding portions.

Figure 3:
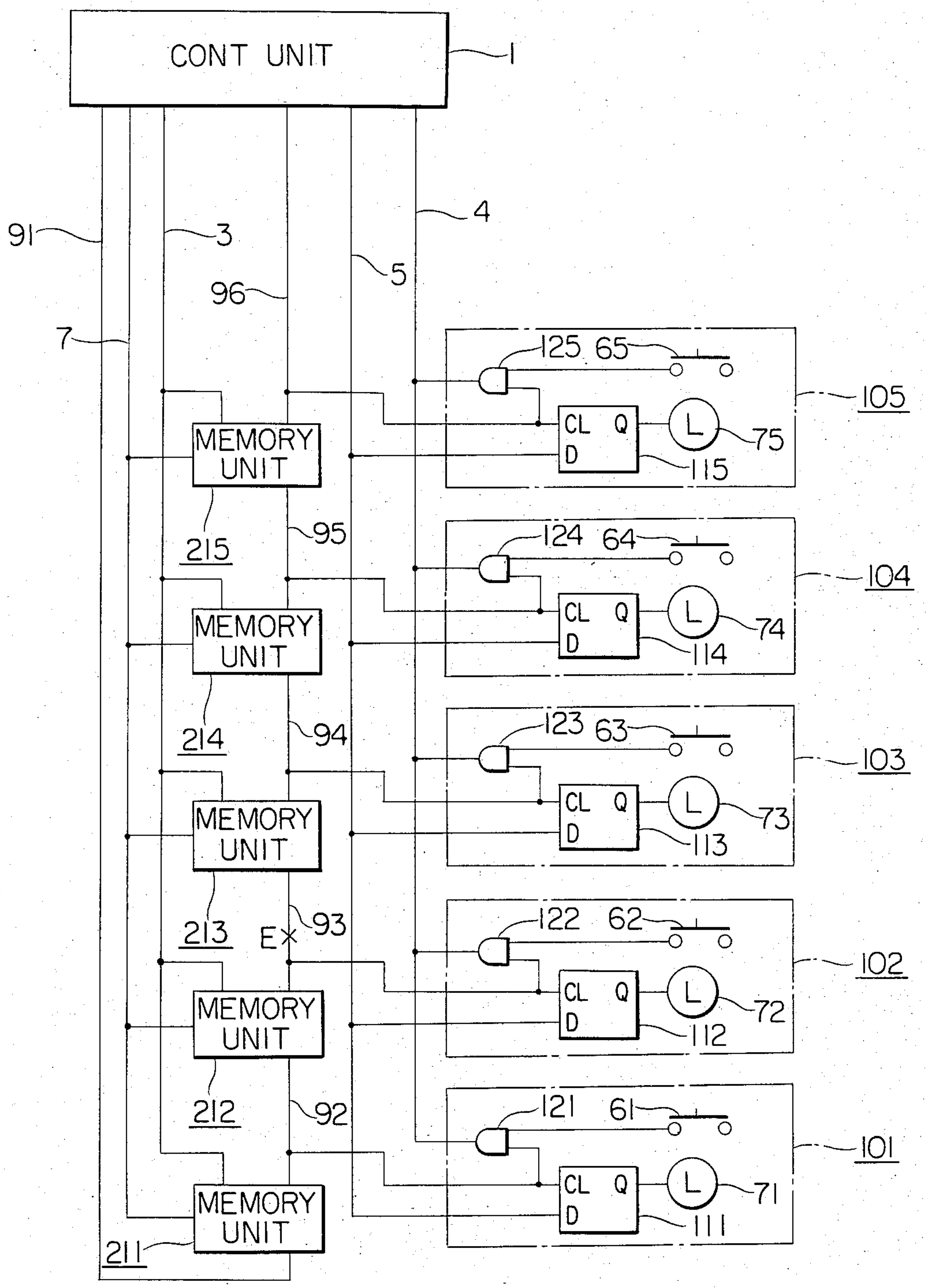
Figure 6:
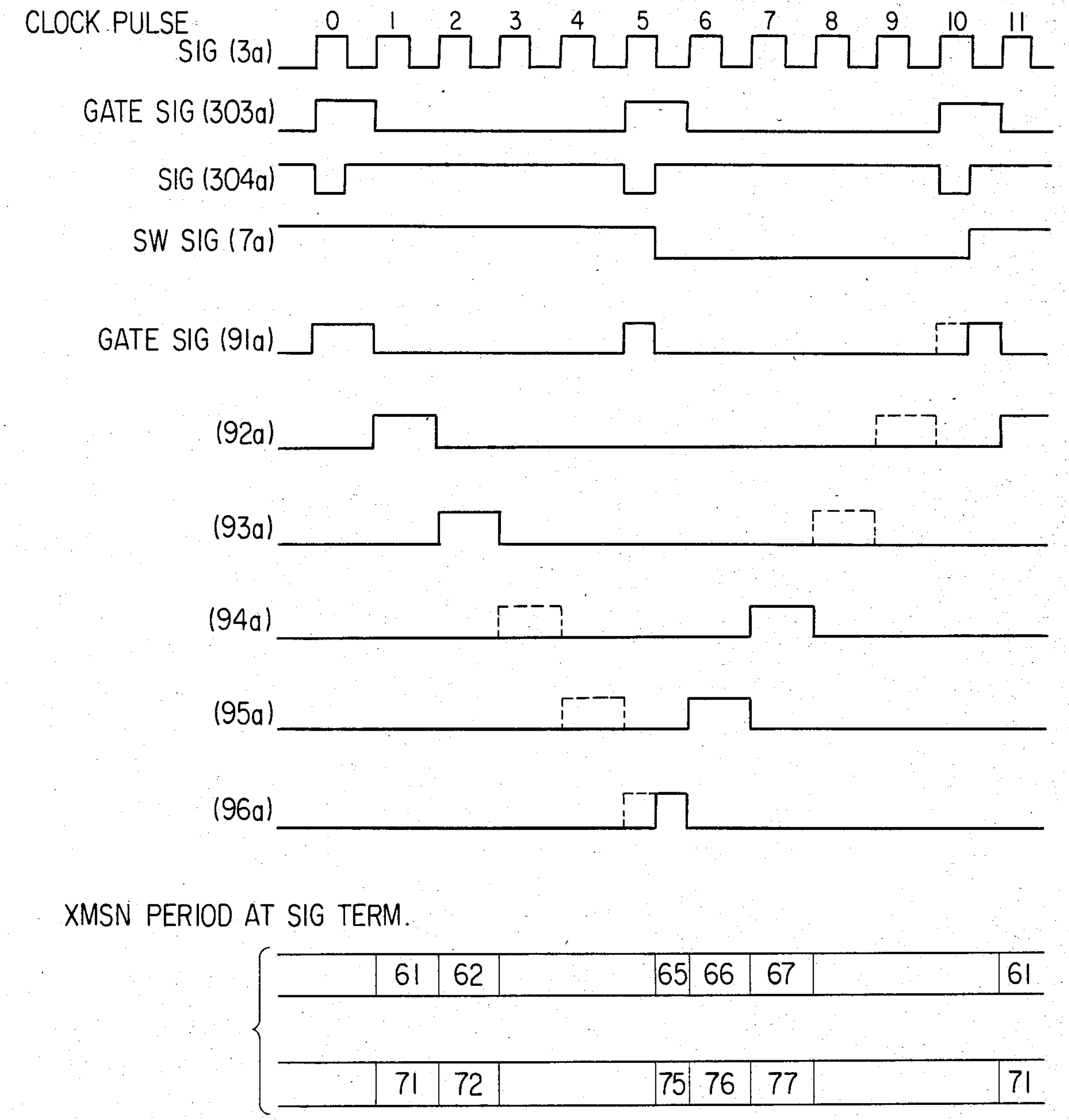

In FIG. 3, first, reference nuemral 7 denotes a signal line which transmits a switching signal 7*a* that is shown in FIG. 6, and reference numerals 211 to 215 denote memory units which are provided on the first to fifth floors, to which the signal lines 3, 7 are connected commonly, and to which are further connected signal lines 91 to 96, memory units 111 to 115, and AND gates 121 to 125, correspondingly.

Figure 4:
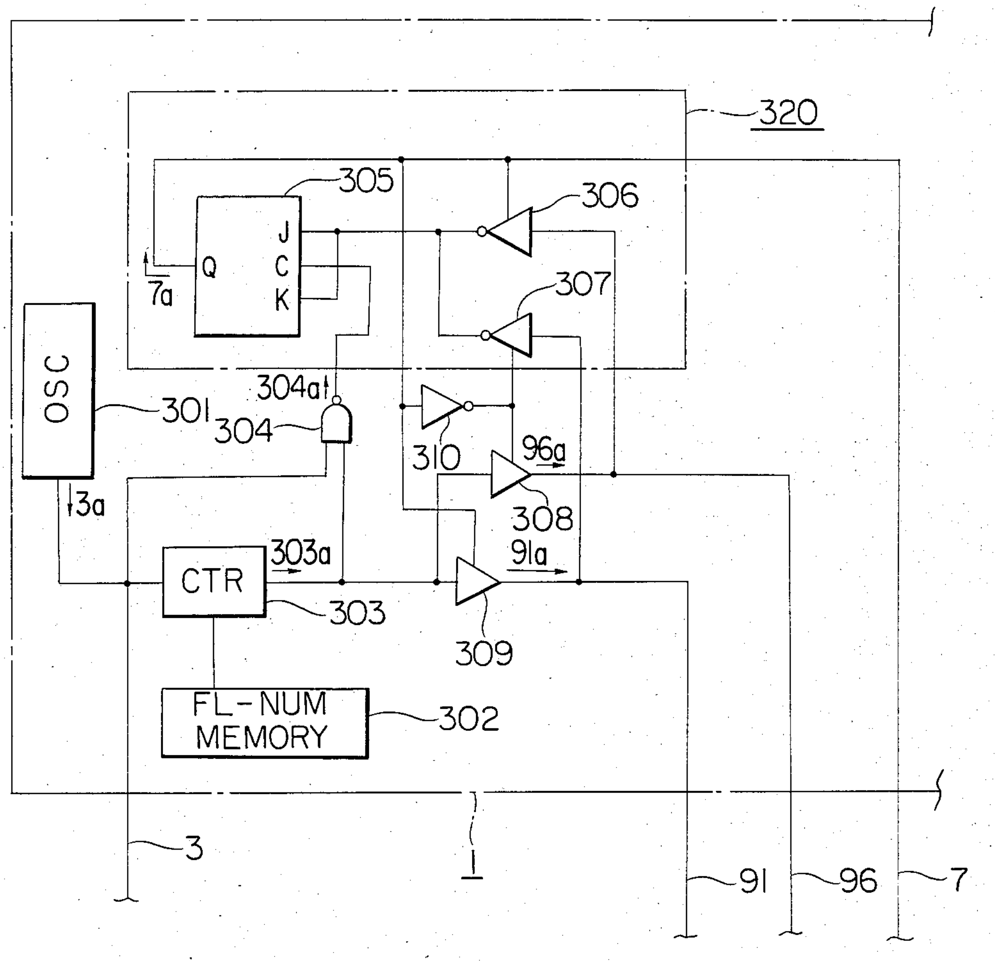

FIG. 4 shows in detail a portion of the control unit 1, wherein reference numeral 301 denotes an oscillator which generates clock pulse signals 3*a* shown in FIG. 6, 302 denotes a floor-number memory means which stores the number of floors where the cage will be stopped. In this embodiment, there are five floors, and a numerical value 5 is stored in the memory means 302. Reference numeral 303 denotes a counter which counts the number of pulses produced by the oscillator 301, and which produces a gate signal 303*a* shown in FIG. 6 every after the counted value becomes equal to the content stored in the floor-number memory means 302. Reference numeral 304 denotes a NAND element which receives the signals 3*a* and the gate signals 303*a*, and which produces a signal 304*a* shown in FIG. 6. Reference numeral 305 denotes a J-K flip-flop circuit (hereinafter referred to as J-K FF) which receives the signal 304*a* through the terminal C and which produces the switching signal 7*a* shown in FIG. 6 from the terminal Q. Reference numeral 306 denotes a logic element which introduces a gate signal 306*a*. The logic element 306 assumes a low-impedance state to invert the signal 306*a* to produce signals of the high and low levels, and assumes a high-impedance state or the open state to interrupt the signal 306*a*. Namely, the logic element 306 produces outputs of three values that will be input to terminals J, K of the J-K FF 305. Reference numeral 307 denotes a logic element which receives a gate signal 91*a*, and which inverts the gate signal 91*a* to produce outputs of three values, i.e., high level, open state, and low level that will be input to the terminals J, K of the J-K FF 305. Reference numeral 308 denotes a logic element which receives the gate signal 303*a* and which produces signals of three values, i.e., high level, open state and low level to the signal line 96, and 309 denotes a logic element which produces the signals to the signal line 91. Reference numeral 310 denotes an inverter element which inverts the switching signal 7*a* and which produces a signal of the low level to open the logic elements 307, 308.

The J-K FF 305 and logic elements 306, 307 constitute a detector means 320 which detects whether the gate signal 303*a* has circulated the memory units 211 to 215.

Figure 5:
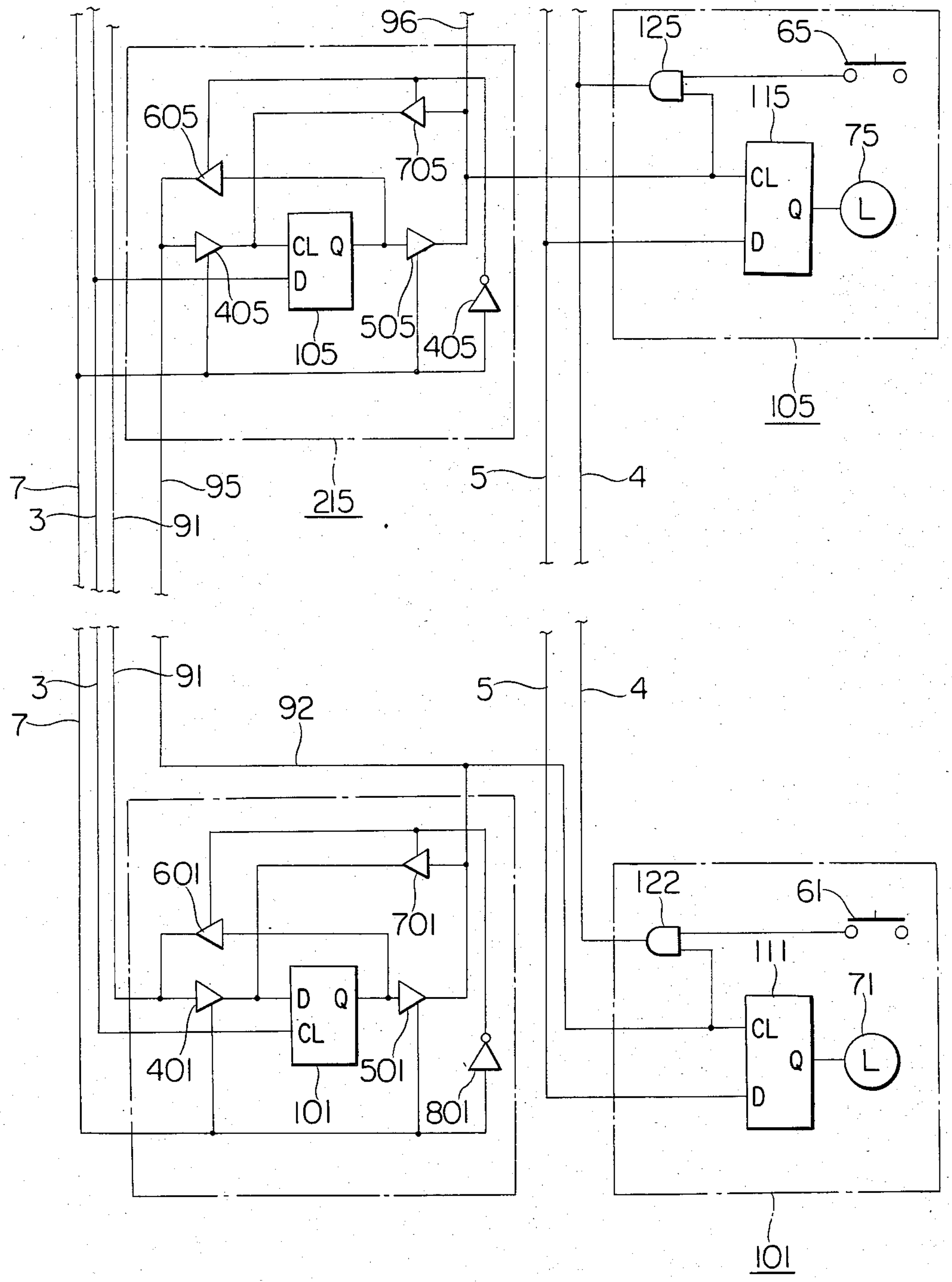

FIG. 5 shows in detail the memory units 211 to 215, wherein reference numeral 401 denotes a logic element which receives the gate signal 91*a* from the signal line 91 and which produces outputs of three values, i.e., high level, open state and low level to the terminal D of a memory unit 101, 501 denotes a logic element which receives a signal from the terminal Q of memory unit 101 and which produces outputs of three values, i.e., high level, open state and low level to the signal line 92, 601 denotes a logic element which receives a signal from the terminal Q of memory unit 101 and which produces outputs of three values, i.e., high level, open state and low level to the signal line 91, 701 denotes a logic element which receives the gate signal 92*a* from the signal line 92 and which produces outputs of three values, i.e., high level, open state and low level to the terminal D of memory unit 101, and 801 denotes an inverter element which inverts the switching signal *7a* and produces a signal of the low level to open the logic elements 601, 701.

Memory units 212, 213, 214 and 215 are also constructed in the same manner as the memory unit 211.

Operation of the thus consturcted signal transmission apparatus will be described below.

The oscillator 301 is continuously producing clock pulse signals 3*a*. It is now presumed that the counter 303 produces a signal of the high level when a O-th clock pulse signal 3*a* is produced in FIG. 6. The output 304*a* of NAND element 304 assumes the low level only during a period in which the clock pulse signal 3*a* assumes the high level. Here, it is also presumed that the J-K FF 305 is continuously producing the switching signal *7a* of the high level from the terminal Q thereof. The logic element 309 is assuming a low impedance, and the gate signal 303*a* is transmitted to the signal line 91. In the memory unit 211, both the logic elements 401 and 501 assume the low impedance condition since the switching signal *7a* is assuming the high level. The gate signal 92*a* assumes the high level only for one period of the clock pulse signal 3*a* when the gate signal 91*a* assumes the low level, like in the conventional art. Likewise, the gate signal 93*a* assumes the high level being lagged by one period as shown in FIG. 6.

When the gate signal 92*a* is assuming the high level, a signal of platform button 61 is sent to the control unit 1 and when the gate signal 93*a* is assuming the high level, a signal of platform button 62 is sent to the control unit 1. Further, when the gate signals 92*a*, 93*a* are assuming the high level, a signal sent to the signal line 5 is stored by the memory units 111, 112, respectively. The memory units 111, 112 produce signals of the high level through the terminals Q thereof, and registration lamps 71, 72 are turned on by these outputs.

It is now supposed that the signal line 93 is broken at a point E shown in FIG. 3. The signal 93*a* is not input to the memory unit 213, and the memory units 213, 214 and 215 do not operate any more. As a fifth clock pulse signal 3*a* is produced in FIG. 6, the gate signal 303*a* assumes the high level, and the signal 304*a* assumes the low level. Since the memory unit 215 does not operate, the gate signal 96*a* remains at the low level. Therefore, the logic element 306 produces an output of the high level which will be input to the terminals K, J of the J-K FF 305. As the signal 304*a* assumes the high level again after a half period of the clock pulse signal 3*a*, the J-K FF 305 produces the switching signal *7a* of the low level. Therefore, the logic elements 306, 309 assume the high-impedance condition, and the logic elements 307, 308 assume the low-impedance condition. As the logic element 309 assumes the high impedance, the gate signal 91*a* assumes the low level after a half period of the clock pulse signal 3*a*. Further, as the logic element 308 assumes the low impedance, the gate signal 303*a* is allowed to pass through for only a half period, and a gate signal 96*a* assumes the high level.

In FIG. 5, the switching signal *7a* is assuming the low level. Therefore, the logic elements 405, 505 assume the high-impedance state, and the logic elements 605, 705 assume the low-impedance state. As the sixth clock pulse signal 3*a* rises, the memory 101 produces an output of the high level, whereby a gate signal 95*a* of the high level is transmitted to the memory unit 214 via the logic element 605 and the signal line 95. While the gate signal 96*a* is assuming the high level, the signal of the signal line 5 is received by the memory unit 115 and is stored therein. At the same time, a signal produced by the platform button 65 is transmitted to the control unit 1 via the element 125 and the signal line 4. This point is the same as that of the conventional art. Similarly, the memory unit 214 operates responsive to the gate signal 95*a* and produces a gate signal 94*a* that will be transmitted to the memory unit 213. Although the memory unit 213 operates properly, the signals are not transmitted between the control unit 1 and the memory 112 or the platform button 62, since the line is broken at the point E. The signals are not transmitted to the memory units 212, 211, either.

As the tenth clock pulse signal 3*a* is produced in FIG. 10, the gate signal 303*a* assumes the high level, and the gate signal 304*a* assumes the low level. Further, since the gate signal 91*a* is assuming the low level, a signal of the high level is input to the terminals J, K of the J-K FF 305 via the logic element 307. Therefore, as the signal 304*a* assumes the high level, the switching signal *7a* is inverted to assume the high level. Due to this inversion, the logic elements 306, 309 assume the low-impedance state, and the logic elements 307, 308 assume the high-impedance state. Therefore, the gate signal 91*a* assumes the high level via the logic element 309. As mentioned earlier, the gate signal 91*a* operates the memory units 211, 212, successively.

According to the above-mentioned embodiment, the signals can be sent to and received from the platform button and the registration lamp, even when the signal line is broken.

Although the above-mentioned embodiment has dealt with the case where the signal line is broken, the same also holds true even in case defect has developed in the memory unit and the signals are not transmitted to the subsequent units. Namely, the signals are alternatingly transmitted from both the memory unit 211 and the memory unit 215, enabling the platform buttons and the signal lamps to operate properly.

Further, although the above-mentioned embodiment has dealt with the elevator system, it should be noted that the invention is in no way limited thereto only, but can be adapted to any system where signals are transmitted in series to a plurality of places, to achieve the desired objects.

In the above embodiment, furthermore, the gate signal 303*a* is generated every after the number of clock pulse signals becomes equal to the number of the platform buttons. The invention, however, should not be limited thereto only. Namely, desired objects can be accomplished even when a gate signal is generated every after the clock pulse signals are generated in a predetermined number which is greater than the number of the platform buttons.

What is claimed is:

1. A signal transmission apparatus comprising:

a control unit for generating clock pulses and receiving signals representing external data through signal lines;

a plurality of signal terminal means respectively connected in parallel with said signal lines for transmitting said data signals;

pulse generator means provided in said control unit for generating said clock pulses;

a counter provided in said control unit for counting said clock pulses and generating a gate signal upon reaching a predetermined number of said clock pulses, said predetermined number being greater than the number of said signal terminal means;

a plurality of memory means corresponding to said plurality of signal terminal means and connected in series one after another from a starting terminal to a terminating terminal, including a starting memory means at the starting terminal and a terminating memory means at the terminating terminal connected to said control unit to constitute a closed loop, one of said starting and terminating memory means receiving and storing a first gate signal from said counter for subsequent transfer along a sending path to the remaining memory means responsive successively to said clock pulses;

detector means for detecting complete transfer of said first gate signal from said starting terminal to said terminating of said memory means before a next gate signal is generated; and switching means for switching said sending path upon a detected result of said detector means so that the first gate signal is sent to one of said starting and terminating memory means.

2. A signal transmission apparatus as set forth in claim 1 wherein said switching means includes means transmitting a next gate signal to the memory means at the starting terminal upon a complete transfer of said first gate signal from said starting terminal to said terminating terminal of said memory means and to the memory means at the terminating terminal upon an incomplete transfer of said first gate signal.

3. A signal transmission apparatus as set forth in claim 2 wherein upon said incomplete transfer of said first gate signal, the memory means at the terminating terminal subsequently transfers said next gate signal to the remaining memory means responsive successively to corresponding clock pulses.

4. A signal transmission apparatus as set forth in claim 2 wherein said switching means includes a first element for transmitting said next gate signal to the memory means at the starting terminal upon said complete transfer and a second element detected by said detector means for transmitting said next gate signal to the memory means at said terminating terminal upon said incomplete transfer.

5. A signal transmission apparatus as set forth in claim 4 wherein said first and second elements are constituted by logic elements having inputs and outputs that produce, depending upon the inputs, signal outputs of high or low level.

6. A signal transmission apparatus as set forth in claim 1 wherein said detector means includes a switching signal generator means for operating said switching means, said switching signal generator means receiving an operation signal from the memory means at the terminating terminal to produce a corresponding switching signal depending upon the content of the operation signal.

7. A signal transmission apparatus as set forth in claim 6 wherein said switching signal generator means includes a flip-flop circuit.

8. A signal transmission apparatus as set forth in claim 1 wherein each of said memory means includes two input terminals to receive gate signals that are successively transferred and an indicative signal from said detector means.

9. A signal transmission apparatus as set forth in claim 8 wherein, among said plurality of memory means, each of the memory means at the starting terminal and at the terminating terminal includes an input terminal for receiving said first gate signal successively transferred from the remaining memory means and each of the remaining memory means includes two input terminals to receive said first gate signal transferred from the neighboring memory means and an indicative signal from said detector means.

10. A signal transmission apparatus as set forth in claim 9 wherein the two input terminals of each of said memory means are switched by logic elements operatively responsive to said indicative signal from said detector means so that one of the two input terminals will receive the gate signal.

* * * * *